US010573167B2

(12) United States Patent
Vollenweider

(10) Patent No.: US 10,573,167 B2
(45) Date of Patent: Feb. 25, 2020

(54) FIRE DETECTOR WITH A SCATTERED LIGHT ARRANGEMENT

(71) Applicant: Siemens Schweiz AG, Zurich (CH)

(72) Inventor: Walter Vollenweider, Steinhausen (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 15/560,609

(22) PCT Filed: Feb. 12, 2016

(86) PCT No.: PCT/EP2016/052961
§ 371 (c)(1),
(2) Date: Sep. 22, 2017

(87) PCT Pub. No.: WO2016/150613
PCT Pub. Date: Sep. 29, 2016

(65) Prior Publication Data
US 2018/0061215 A1 Mar. 1, 2018

(30) Foreign Application Priority Data
Mar. 23, 2015 (EP) .................................... 15160271

(51) Int. Cl.
*G08B 29/04* (2006.01)
*G08B 17/107* (2006.01)
(Continued)

(52) U.S. Cl.
CPC ......... *G08B 29/043* (2013.01); *G08B 17/107* (2013.01); *G08B 17/117* (2013.01); *G08B 21/12* (2013.01)

(58) Field of Classification Search
CPC .. G08B 29/043; G08B 17/107; G08B 17/117; G08B 21/12
(Continued)

(56) References Cited

U.S. PATENT DOCUMENTS 5,008,559 A * 4/1991 Beyersdorf .......... G08B 17/107 250/575
5,381,130 A * 1/1995 Thuillard ............. G08B 17/107 250/575
(Continued)

FOREIGN PATENT DOCUMENTS

CN 101515400 A 8/2009 ........... G08B 17/107
CN 102999993 A 3/2013 ............. G08B 17/00
(Continued)

OTHER PUBLICATIONS

International Search Report and Written Opinion, Application No. PCT/EP2016/052961, 18 pages, dated Apr. 29, 2016.
(Continued)

*Primary Examiner* — Omar Casillashernandez
(74) *Attorney, Agent, or Firm* — Slayden Grubert Beard PLLC

(57) ABSTRACT

The present disclosure relates to fire detectors. For example, a fire detector may include: a housing with a smoke inlet; a detection unit for specific fire parameters; an analyzing unit for generating a fire alarm; a light transmitter; and a light receiver connected to the analyzing unit for monitoring the smoke inlet for impermissible pollution. The light transmitter and the light receiver comprise a scattered light arrangement with a scattered light volume near the smoke inlet and susceptible to pollution. A part of a light bundle traverses the region without striking adjacent housing parts, or a part of the light strikes a housing part and the housing part deflects the second part of the light bundle away from the light receiver or absorbs it. The analyzing unit sends a service message if the scattered light detected by the light receiver exceeds a threshold value.

14 Claims, 2 Drawing Sheets

(51) Int. Cl.
*G08B 17/117* (2006.01)
*G08B 21/12* (2006.01)

(58) Field of Classification Search
USPC .............................................. 340/506; 30/506
See application file for complete search history.

(56) References Cited

U.S. PATENT DOCUMENTS

| | | | | |
|---|---|---|---|---|
| 5,659,292 | A * | 8/1997 | Tice | G08B 29/183 340/286.05 |
| 5,859,706 | A * | 1/1999 | Nagashima | G08B 29/145 250/574 |
| 6,184,537 | B1 * | 2/2001 | Knox | G01N 21/53 250/574 |
| 8,546,740 | B2 | 10/2013 | Vollenweider | 250/221 |
| 9,251,683 | B2 | 2/2016 | Petrovic | |
| 2011/0037971 | A1 * | 2/2011 | Loepfe | G08B 17/107 356/51 |
| 2012/0001760 | A1 | 1/2012 | Harchanko | 340/578 |
| 2013/0176131 | A1 | 7/2013 | Pichard et al. | 340/630 |
| 2014/0111803 | A1 * | 4/2014 | Matsukuma | G01N 21/53 356/338 |
| 2014/0168647 | A1 * | 6/2014 | Ju | G01N 21/53 356/338 |

FOREIGN PATENT DOCUMENTS

| | | | | |
|---|---|---|---|---|
| CN | 103098106 | A | 5/2013 | G08B 17/06 |
| CN | 103210431 | A | 7/2013 | G01N 21/53 |
| CN | 104392577 | A | 3/2015 | G01N 15/02 |
| CN | 104408863 | A | 3/2015 | G08B 17/103 |
| EP | 2330577 | A1 | 6/2011 | G08B 29/04 |
| JP | 02181297 | A | 7/1990 | G01N 21/53 |
| WO | 2012/041580 | A1 | 4/2012 | G08B 29/14 |
| WO | 2016/150613 | A1 | 9/2016 | G08B 29/04 |

OTHER PUBLICATIONS

Chinese Office Action, Application No. 201680029954.2, 6 pages, dated Dec. 21, 2018.

* cited by examiner

FIRE DETECTOR WITH A SCATTERED LIGHT ARRANGEMENT

CROSS-REFERENCE TO RELATED APPLICATIONS

This application is a U.S. National Stage Application of International Application No. PCT/EP2016/052961 filed Feb. 12, 2016, which designates the United States of America, and claims priority to EP Application No. 15160271.1 filed Mar. 23, 2015, the contents of which are hereby incorporated by reference in their entirety.

TECHNICAL FIELD

The present disclosure relates to fire detectors. Teachings thereof may be embodied in an optical smoke detector.

BACKGROUND

A typical fire detector may include a smoke detector, smoke gas detectors, or smoke alarms. Some detectors may be referred to as point detectors or as point-type detectors. These types of fire detector typically have a detection unit operating in accordance with the scattered light principle for detection of smoke particles. As an alternative or in addition they can have a gas sensor for detecting gases typical of a fire. Furthermore such fire detectors may include a temperature sensor for detection of an impermissibly high temperature in their environment.

Furthermore the fire detectors may be connected via a common detection line, in particular via a two-wire line, to a fire alarm center for signaling and/or data transmission. They can also have an autonomous energy supply, such as a battery. Furthermore the fire detector can have a radio module for transmitting an alarm message, a warning message, or status information to a neighboring fire detector or to a fire alarm center. They can also forward an alarm message, warning message, or status information transmitted by radio from a neighboring fire detector to a further neighboring fire detector or to a fire alarm center.

According to Standard DIN 14676 "Smoke alarm devices for use in residential buildings, apartments and rooms with similar purposes—Installation, use and maintenance" said devices are to be checked at least once a year using a prescribed visual and function test. This can also be done automatically. The object of the testing is to check that on the one hand there are no disruptive objects in the environment of the smoke alarm device, such as e.g. in a circular area of half a meter around the smoke alarm device, which could cause the flow of the smoke to be detected in the event of a fire to be screened off. On the other hand the smoke inlet openings in the housing are to be regularly tested for their ability to allow smoke or smoke gas to pass through them.

SUMMARY

The teachings of the present disclosure may be embodied in a fire detector that makes automated, reliable testing of a smoke inlet opening possible. For example, the fire detector may include a detector housing with a smoke inlet opening, a detection unit arranged in the detector housing for detection of specific fire parameters, an analyzing unit for outputting a fire alarm, and at least one light transmitter and light receiver connected to the analyzing unit for monitoring the smoke inlet opening for impermissible pollution and/or obstruction.

In some embodiments a fire detector, in particular an optical smoke detector, may include a detector housing (3) with a smoke inlet opening (OF), a detection unit (DET) arranged in the detector housing (3) for detection of specific fire parameters, an analyzing unit (7) for output of a fire alarm (AL), and at least one light transmitter (1) and light receiver (2) connected to the analyzing unit (7) for monitoring the smoke inlet opening (OF) for impermissible pollution (V), characterized in that, the light transmitter (1) and the light receiver (2) are arranged in a scattered light arrangement, wherein a scattered light volume (SV) defined by the scattered light arrangement lies in a region of the smoke inlet opening (OF) susceptible to pollution (V). The light transmitter (1) is designed and oriented such that a first part (D) of a light bundle (L) transmitted traverses the region of the smoke inlet opening (OF), without striking adjacent housing parts (4, 5, 8, N) and/or the light transmitter (1) is designed and oriented such that a second part (A) of the light bundle (L) strikes a housing part (4, 5, 8, N) adjoining the smoke inlet opening (OF), wherein the surface of the housing part (4, 5, 8, N) is produced and oriented such that the second part (A) of the light bundle (L) striking it is deflected away from the light receiver (2) or is absorbed there, and a service message (WARN) is able to be output by means of the analyzing unit (7) if the scattered light (S) detected by the light receiver exceeds a minimum value.

In some embodiments, the detector housing (3) is essentially embodied symmetrically and has an axis of symmetry (Z), wherein a number of light transmitters (1) and light receivers (2) are arranged distributed in the circumferential direction around the axis of symmetry (Z) in a respective scattered light arrangement in the region of the smoke inlet opening (OF).

In some embodiments, a respective light transmitter (1) and a respective light receiver (2) are arranged in a forwards scatter arrangement with a scattered light angle (α) in the range of 20° to 80°.

In some embodiments, a respective light transmitter (1) and a respective light receiver (2) are arranged in a backwards scatter arrangement with a scattered light angle (α) in the range of 110° to 150°.

In some embodiments, a respective light transmitter (1) and a respective light receiver (2) are combined to form a light transceiver (10) as a constructional unit and are arranged in a backwards scatter arrangement with a scattered light angle (α) in the range of 150° to 180°.

In some embodiments, the housing part (4, 5, 8, N) in the region of the smoke inlet opening (OF) is a base body (4) or a detector cap (5) of the detector housing (3), an insect guard (N) or a connecting web (9) between base body (4) and detector cap (5).

In some embodiments, a respective light transmitter (1), a respective light receiver (2) and/or a respective light transceiver (10) is arranged on a circuit carrier (6) in the detector housing (3), wherein the respective light transmitter (1), light receiver (2) and/or light transceiver (10) have an optical waveguide connected upstream and wherein an opposite end section (14) of the respective optical waveguide (8) is routed through the detector housing (3, 4) for coupling-out and/or coupling-in light in the region of the smoke inlet opening (OF).

In some embodiments, a respective light transmitter (1) is arranged on a circuit carrier (6) in the detector housing (3), wherein an optical waveguide is connected upstream of the respective light transmitter (1), wherein an opposite end section (14) of the respective optical waveguide (8) is routed through the detector housing (3, 4) for coupling out of light in the region of the smoke inlet opening (OF), and wherein the respective light receiver (2') is arranged on the detector cap (5) in the region of the smoke inlet opening (OF).

In some embodiments, the respective end section (14) of an optical waveguide (8) embodies an optical lens and/or an optical prism.

In some embodiments, the respective optical waveguide (8) is at the same time part of a connecting web (9) between a base body (4) and a detector cap (5) of the detector housing (3).

BRIEF DESCRIPTION OF THE DRAWINGS

The teachings of the present disclosure, as well as example, are described in light of the example of the figures shown below, in which.

DETAILED DESCRIPTION

Figure 1:
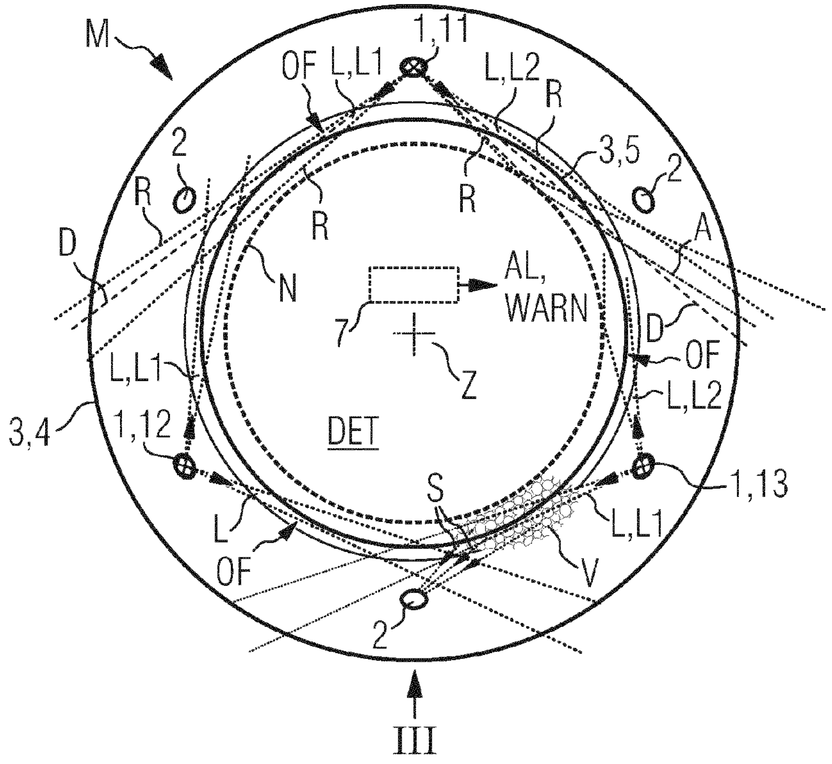
FIG. 1 shows an overhead view of an example of a fire detector with three light transmitters and three light receivers for pollution monitoring in accordance with the teachings of the present disclosure.

In accordance with the teachings of the present disclosure, the light transmitter and the light receiver may be arranged in a scattered light arrangement. A scattered light volume defined by the scattered light arrangement lies in the region of a smoke inlet opening and especially in a region of the smoke inlet opening susceptible to pollution. The smoke inlet opening itself can be subdivided into two parts or a number of parts, such as by connecting webs for example. It can be composed of a number of slits or holes. The light transmitter may comprise a light-emitting diode, such as an IR light-emitting diode, a light-emitting diode emitting white, red, green or blue light, or a UV light-emitting diode.

In some embodiments, the light transmitter may comprise a laser diode. The light receiver is typically a photodiode or phototransistor tuned spectrally to the light transmitter. The light transmitter may be oriented such that a first part of a light bundle transmitted traverses the region of the smoke inlet opening, without striking adjoining parts of the housing. In other words the first part of the emitted light bundle traverses the region of the smoke inlet opening in a non-contact manner. This can be achieved for example by a diaphragm connected downstream of the light transmitter. In the case of a laser beam as the first part of the light bundle, said beam is already sharply delimited by virtue of its optical generation. The housing part in the region of the smoke inlet opening is e.g. a base body or a detector cap of the detector housing, an insect guard or a connecting web between base body and detector cap. The insect guard may comprise a net or grille.

In some embodiments, the light transmitter may be oriented such that a second part of the light bundle strikes a part of the housing adjoining the smoke inlet opening. The surface of the housing part in this case may be produced and/or oriented so that the second part of the light bundle striking it is diverted away from the light receiver or absorbed. This means that, in the event of there being no pollution or only slight pollution present, no (appreciable) light originating from the light transmitter reaches the light receiver. The second part of the housing can be shiny or reflective. The alignment of the housing part is determined relative to the detector housing so that the reflected light bundle may be deflected into the environment of the fire detector and thus away from the light receiver. As an alternative the housing part can have a light-absorbing layer, such as a so-called "super black". Such substances absorb far more than 99% of the light that strikes them and are obtainable for example from the company Surrey Nanosystems under the brand name Vantablack®.

In some embodiments, a service message may be sent from the analyzing unit if the scattered light detected by the light receiver exceeds a minimum value. The service message can also feature a degree of pollution, such as a percentage value, wherein 0% would mean no pollution and 100% complete pollution or obstruction.

In some embodiments, the analyzing unit may comprise a processor-supported processing unit, such as a microcontroller or processor. It can also be referred to as an (electronic) control unit. The service message can be forwarded wirelessly or via a connected bus, e.g. to a higher-ranking fire alarm center, to inform service personnel about an upcoming cleaning of the fire detector concerned. In some embodiments, the service message may include an LED lighting up or by a flashing LED, or by a warning beeper of the fire detector.

In some embodiments, the analyzing unit may activate the light transmitters one after another. It can be designed selectively to detect and to analyze a receive signal of the at least one assigned light receiver.

In some embodiments, a fire/smoke detector senses the light scattered by pollution and detected as a measure for the pollution of a fire detector. In the event of a non-polluted fire detector, such as e.g. in its new state, or with only slight pollution, no appreciable scattered light is detectable. On the other hand, in the event of increasing pollution, the scattering cross-section in the scattered light volume also increases, so that the scattered light increases at the same time as the pollution increases. Because of the high dynamic scope of a photo receiver the extent of any pollution may be established.

The extinction technique is used in the prior art on the other hand, in which the light transmitter and the light receiver lie on a common optical axis. In this case the attenuation of the received light as a result of pollution is established. Such a system has only a small dynamic range and difficult calibration of this arrangement to a maximum light value for no pollution. To avoid a false alarm, the limit value for the light to be detected is set low. Even a "slight" fluff of pollution accumulated in the smoke inlet opening almost completely suppresses the entry of smoke through the inlet opening, while the reduction in the detected light is only slight. The fire detector is then no longer capable of functioning but there is no corresponding output of a pollution warning.

In some embodiments, the detector housing is essentially symmetrical, especially rotationally-symmetrical, around an axis of symmetry. The axis of symmetry may be the main constructive axis of the fire detector housing. A number of light transmitters and light receivers are arranged distributed in the circumferential direction around the axis of symmetry in a respective scattered light arrangement in the region of the smoke inlet opening. The entire smoke inlet opening may be monitored for pollution along its entire circumference.

In some embodiments, the light transmitter and light receiver alternate in the circumferential direction. They may be arranged evenly distributed along the circumference. The respective light transmitter may be arranged in a scattered light arrangement in relation to its two neighboring light receivers in the circumferential direction in each case.

In some embodiments, a respective light transmitter and a respective light receiver are arranged in a forward scatter arrangement with a scattered light angle in the range of 20° to 80°. In some embodiments, a respective light transmitter can be arranged in a backwards scatter arrangement with a scattered light angle in the range of 110° to 150°.

In some embodiments, a respective light transmitter and a respective light receiver can be grouped together as a unit into a light transceiver. Light transmitter and light receiver are then arranged in a backwards scatter arrangement with a scattered light angle in the range of 150° to 180°. The integration of light transmitter and light receiver into a single constructional unit may be useful.

In some embodiments, a respective light transmitter, a respective light receiver, and/or a respective light transceiver are arranged on one circuit carrier in the detector housing. An optical waveguide is connected upstream of the respective light transmitter, the light receiver, and/or the light transceiver. An opposite (second) end section of the optical waveguide may be routed out through the detector housing for coupling-out and/or coupling-in the light in the region of the smoke inlet opening. "Connected upstream" means that a first end section of the optical waveguide, for coupling-in of the light or coupling-out of the light, lies opposite the respective optically active surface of the light transmitter, light receiver, or light transceiver.

In some embodiments, a respective light transmitter is arranged on a circuit carrier in the detector housing. An optical waveguide is connected upstream of the respective light transmitter, wherein an opposite (second) end section of the respective optical waveguide is routed through the detector housing for coupling-out light in the region of the smoke inlet opening. The respective light receiver may be arranged on the detector cap in the region of the smoke inlet opening. In some embodiments, the respective (second) end section of an optical waveguide is an optical lens and/or an optical prism. This makes a directed coupling-in and coupling-out of light possible.

In some embodiments, the respective optical waveguide is at the same time part of a connecting web between a base body and a detector cap of the detector housing. Through the integration of the optical waveguide into the connecting web the optical waveguides are protected from mechanical influences. In addition the respective end section lies in the "pollution shadow" through the local flow-screening effect of the connecting web.

FIG. 1 shows an overhead view of an example of a fire detector M with three light transmitters 1 and three light receivers 2 for pollution monitoring in accordance with the teachings of the present disclosure.

The fire detector M shown is an optical smoke detector. In some embodiments, it includes a detection unit DET arranged in detector housing 3 for detection of specific fire parameters. The detection unit DET is screened from direct ambient light, such as e.g. by lamella, but is permeable for the smoke to be detected. The housing 3 shown comprises a base body 4 and a so-called detector cap 5 offset therefrom. Embodied between these two housing parts 4, 5 is a smoke inlet opening OF for the possible passage of smoke to be detected through to the detection unit DET. An insect guard, which prevents insects or spiders from getting into the detection unit DET, is labeled with the reference character N. In some embodiments, the guard may be a grille or a net.

The fire detector M includes an analyzing unit 7 for output of a fire alarm AL. The analyzing unit 7 is typically processor-based and in some embodiments comprises a microcontroller. The fire alarm AL can be output via a connected alarm line, wirelessly, and/or via an optical or acoustic indication on the fire detector M.

At least one light transmitter 1 and one light receiver 2 is connected to the analyzing unit 7. They are used for monitoring the smoke inlet opening OF for impermissible pollution V. In some embodiments, three light transmitters 1 are arranged distributed evenly in the circumferential direction around an axis of symmetry Z of the fire detector M. Three light receivers 2 are arranged between them, likewise in the circumferential direction.

In some embodiments, the at least one light transmitter 1 and the at least one light receiver 2 are arranged in a scattered light arrangement. A "scattered light arrangement" means that none of the light receivers 2 is oriented to one of the light transmitters 1. In other words, the respective light receivers 2 do not receive any direct light from the respective light transmitters 1 of a common scattered light arrangement. Light transmitter and assigned light receiver thus do not lie on a common optical axis.

In some embodiments, the three light transmitters 1 each transmit two light bundles L1, L2 to the two neighboring light receivers 2 in the circumferential direction. In some embodiments, a respective scattered light volume SV is defined by means of the scattered light arrangement such that said volume lies in a region of the smoke inlet opening OF susceptible to pollution V. The scattered light volumes SV1, SV2 formed by two scattered light arrangements are shown in detail in the example of FIG. 2.

The light transmitters 1, 11, 12 may be oriented such that a first part D of a transmitted light bundle L1 traverses the region of the smoke inlet opening OF, without touching adjoining housing parts 4, 5, 8, N. In other words, the light bundle L1 passes the region of the smoke inlet opening OF without touching anything. Such an adjoining housing part 4, 5, 8, N can be the base body 4, the detector cap 5 of the detector housing 3, an insect guard N, or a connecting web 9. The light bundle L1 is preferably sharply delimited. This can be done for example by a diaphragm which is arranged downstream of a respective light transmitter 1. In the case of a laser diode as light transmitter 1 the transmitted light bundle L1 is already sharply delimited. In the present example of FIG. 1 both light bundles L1 transmitted by the light transmitters 11, 12 traverse the region of the smoke inlet opening OF without touching it. In this case the first part D of the transmitted light bundle L1 corresponds to the light bundle L1 itself. The delimitation of the light bundles L1, L2 is indicated by edge rays R drawn in as dotted lines.

As is shown by way of example in FIG. 1, the light transmitter 1 may be oriented such that a second part A of the light bundle L2 strikes a housing part 4, 5, 8, N adjoining the smoke inlet opening OF. In the present example this is the case for the two light bundles L2 transmitted by the light transmitters 11, 13. In this case the surface of the housing part 4, 5, 8, N is oriented such that the second part A of the light bundle L2 striking said surface is deflected away from the light receiver 2. In the present example, the adjoining housing part N, i.e. the insect guard, is reflective. The outer surfaces of the insect guard N are optically oriented in relation to the light arriving from the light transmitters 11, 13 such that the second part A of the light bundle L2 reflected thereon does not reach the assigned light receiver 2. On the other hand, a first part D of the second light bundle L2, as previously described, also traverses the region of the shown smoke inlet opening OF without touching it.

In some embodiments, in the pollution-free state or with only slight pollution, no appreciable transmitted light reaches the respective assigned light receivers 2 from the light transmitters 1. As FIG. 1 shows in its lower right-hand part, a part of the light bundle L1 transmitted by the light transmitter 13 will be reflected on pollution and/or obstruction V accumulated in the region of the smoke inlet opening OF. For example, the pollution/obstruction V can be an accumulation of dust, dust flakes, or lint. This scattered light S finally reaches the light receiver 2 for detection. In some embodiments, a service message WARN is sent out by the analyzing unit 7, if the scattered light S detected by the light receiver 2 exceeds a predetermined minimum value.

Figure 2:
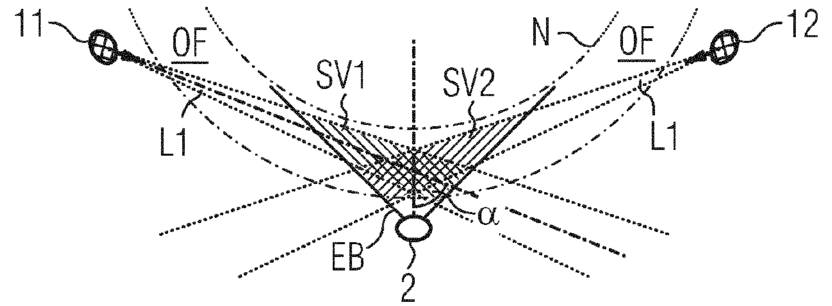
FIG. 2 shows an overhead view of two scattered light arrangements in FIG. 1 in detail, formed from the two light transmitters and the common light receiver.

FIG. 2 shows an overhead view of two scattered light arrangements in FIG. 1 in detail, formed from the two light transmitters 11, 12 and the common light receiver 2. EB designates the receive region of the light receiver 2. This may be sharply delimited, such as by a diaphragm situated upstream. SV1 designates a first scattered light volume, which, in respect of its geometry, is the volume of intersection between the light bundle L1 of the light transmitter 11 and the receive region EB of the light receiver 2. SV2 designates a second scattered light volume, which in a corresponding manner is the volume of intersection between the light bundle L1 of the light transmitter 12 and the receive region EB of the light receiver 2. The two scattered light volumes SV1, SV2 shown shaded, which partly overlap, lie in the region of the smoke inlet opening OF. Pollution V in the region of such a scattered light volume SV1, SV2 leads to part of the light scattered thereon reaching the light receiver 2 and being able to be detected thereby.

In some embodiments, the light receiver 2 is arranged in a forward scatter arrangement with the neighboring light transmitters 11, 12 with a scattered light angle α of 120°.

Figure 3:
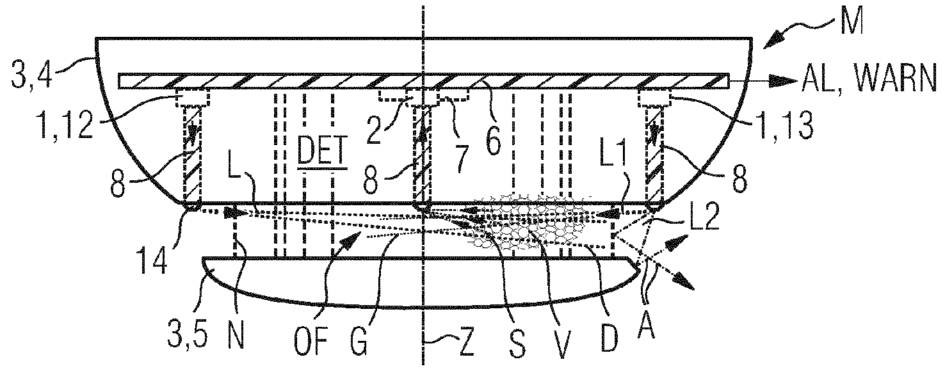
FIG. 3 shows a side view of the fire detector in accordance with FIG. 1 along the direction of view III entered in this figure.

FIG. 3 shows a side view of the fire detector M in accordance with FIG. 1 along the direction of view III entered there. In this diagram, it can be seen how a second part A of the light bundle L2 transmitted by the light transmitter 13 is reflected both on the insect guard N and also on an outer contour of the detector cap 5 such that no light of the light bundle L2 reaches the assigned light receiver 2. By contrast a part of the light bundle L1 transmitted by the light transmitter 13 will be scattered on the pollution V there and detected as scattered light S by the light receiver 2. G designates light rays damped and attenuated by the pollution V.

As the example of FIG. 3 further shows, the fire detector M may include a circuit carrier 6 arranged in the detector housing 3, on which the three light transmitters 1 and the three light receivers 2 are arranged. Connected upstream of it in the region of the smoke inlet opening OF is an optical waveguide 8 for coupling-out light and/or coupling-in light. The respective optical waveguides 8 may be routed through a corresponding cutout in the detector housing 3 and in the present example in the base body 4 of the fire detector M in the region of the smoke inlet opening OF. The six optical waveguides 8 protrude slightly in this case, e.g. in the range of 1 mm to 10 mm, from the base body 4. The optical waveguides 8 may comprise a rod-shaped cylindrical plastic, which is transparent for light in the wavelength of the light transmitted by the light transmitters 1.

In some embodiments, the respective end section 14, which protrudes through the base body 4 into the region of the smoke inlet opening OF, forms an optical lens and/or an optical prism. The geometrical design of the respective end section 14 may depend on whether the optical waveguide 8 is used for coupling-out of light or for coupling-in of light. In the first case, the respective end section 14 can be such that two light bundles L1, L2, as shown in FIG. 1, are transmitted. In the second case, the optical waveguides 8 upstream of the light receivers 2 are such that light can be detected in a predetermined receive area EB, such as is shown for example in FIG. 2. The use of optical waveguides 8 may provide simple mechanical design of the fire detector M.

In some embodiments, the light transmitters 1 and/or the light receivers 2 can also be arranged directly in the region of the smoke inlet opening OF. These can have an upstream optical means for coupling-out light or coupling-in light, such as an optical lens and/or an optical prism and/or a diaphragm. The corresponding electrical connections may be connected to the circuit carrier 6 and via said carrier to the analyzing unit 7 for electrical activation of the light transmitters 1 and for detection of the respective electrical signals from the light receivers 2.

Figure 4:
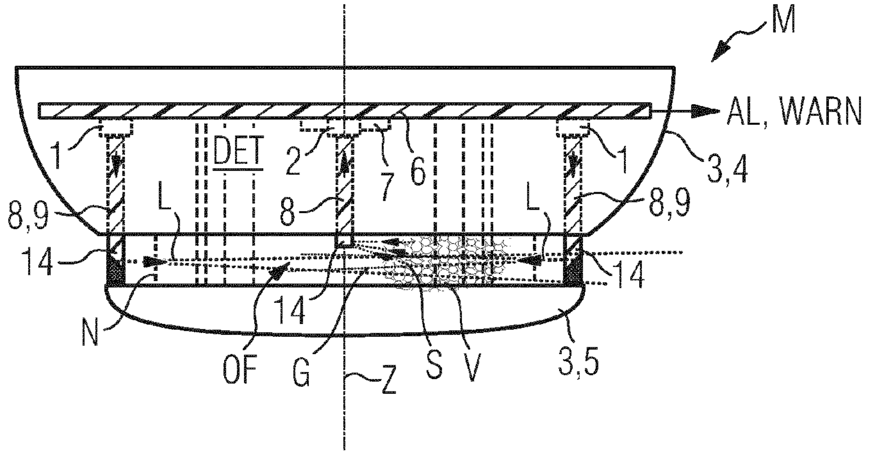
FIG. 4 shows a side view of the inventive fire detector in accordance with the teachings of the present disclosure.

FIG. 4 shows a side view of an example fire detector M in accordance with teachings of the present disclosure. In this embodiment, the optical waveguides 8 downstream of the light transmitters 1 are at the same time also part of a connecting web 9, which connects the base body 4 mechanically to the detector cap 5. As FIG. 4 also shows, the associated end section 14 of the optical waveguide or of the connecting web 9 may comprise a prism arranged at a 45° angle in relation to the incident light bundle of the light transmitter 1. This causes the light bundle L to be deflected by 90° and directed into the region of the smoke inlet opening OF to be monitored. The surface of the end section 14 inclined at an angle of 45° or the part of the connecting web 9 adjoining it can also have a mirror finish. In a corresponding way, the optical waveguides 8, which are upstream of the light receivers 2, are part of such a connecting web 9.

Figure 5:
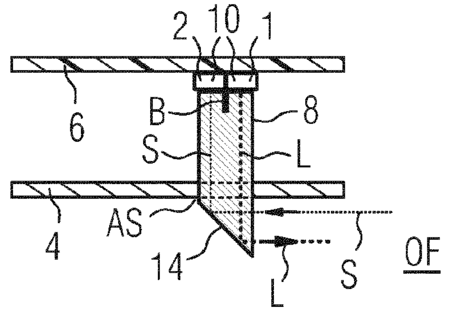
FIG. 5 shows an example of coupling-in of light and coupling-out of light in the region of a smoke inlet opening by means of a common optical waveguide in accordance with the teachings of the present disclosure.

FIG. 5 shows an example of an example coupling-in and coupling-out of light in the region of a smoke inlet opening OF by means of a common optical waveguide 8. A light transceiver, which comprises a light transmitter 1 and a light receiver 2, is designated by the reference character 10 as a constructional unit. The light transceiver 10 for its part is arranged on a circuit carrier 6 in the base body 4 of the fire detector M. Light transmitter 1 and light receiver 2 are arranged for example in a backwards scatter arrangement with a scattered light angle of 180°. Downstream of the light transceiver 10 is an optical waveguide 8, which may be both for coupling-in and for coupling-out light.

The optical waveguide 8 is routed through a cutout 8 in the base body 4 in the region of the smoke inlet opening OF. The end section 14 protruding into this region is such that a light bundle L transmitted by the light transmitter 1 is diverted into the region of the smoke inlet opening OF and that scattered light from this region can be coupled back in again on reversed paths for detection by the light receiver 2. B refers to a diaphragm, which greatly reduces direct crosstalk between the transmitted light of the light transmitter 1 and the light receiver 2.

This arrangement may provide a reduced number of elements for a scattered light arrangement. In some embodiments, the fire detector M has a plurality of such light transceivers 10 distributed in the circumferential direction in the region of the smoke inlet opening OF.

Figure 6:
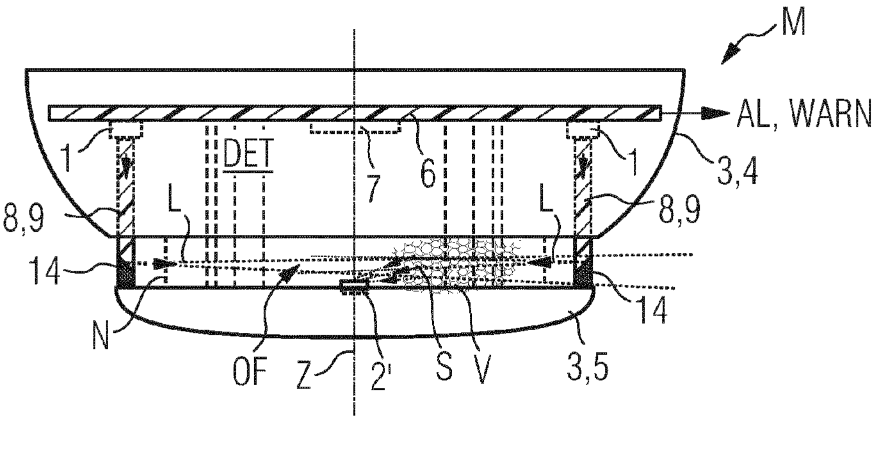
FIG. 6 shows a side view of an inventive fire detector in accordance with the teachings of the present disclosure.

FIG. 6 shows a side view of an example fire detector M in accordance with teachings of the present disclosure. In this case, a respective light receiver 2' is adjacent to the smoke inlet opening OF on the detector cap 5 or the fire detector M. Scattered light S is detected by this light receiver 2' in the event of pollution V.

LIST OF REFERENCE CHARACTERS

1, 11-13 Light transmitter
2, 2' Light receiver
3 Detector housing
4 Base body
5 Detector cap
6 Circuit board
7 Analyzing unit, control unit, microcontroller
8 Optical waveguide
9 Connecting web
10 Light transceiver
14 Optical coupling element, optical end section
A Deflected light beam
AL Alarm information, alarm message
AS Cutout, breakthrough
B Diaphragm
D Direct light beam, non-deflected light beam
DET Detection chamber, detection unit
G Attenuated light beam
L, L1, L2 Light bundle
M Hazard detector, smoke detector
N Insect guard, grille, net, lamella
OF Smoke inlet opening
R Edge beams
S Scattered light, scattered light beam
SV, SV1, SV2 Scattered light volume, scattered light center
V Pollution, fluff, dust
WARN Warning message, service message
Z Axis of symmetry, main axis

What is claimed is:

1. A fire detector comprising:

a detector housing with a smoke inlet opening;

a smoke detector, an optical smoke detector, a temperature detector, and/or gas detector mounted in the detector housing for detection of specific fire parameters corresponding to the presence of fire;

an analyzing unit for output of a fire alarm based on the detection of the specific fire parameters;

a light transmitter;

a light receiver connected to the analyzing unit for monitoring the smoke inlet opening for impermissible pollution and not for specific fire parameters;

wherein the light receiver is mounted on a circuit carrier mounted in the detector housing; and an optical waveguide connected at a first end to the light receiver and extending through the detector housing such that a second end of the optical waveguide is exposed to the smoke inlet opening, wherein the optical waveguide is configured receive light at the second end of the optical waveguide, and transfer the received light through the detector housing and to the light receiver mounted in the detector housing;

wherein the light transmitter and the light receiver comprise a scattered light arrangement with a scattered light volume defined by the scattered light arrangement in a region of the smoke inlet opening susceptible to pollution;

wherein the analyzing unit is configured to send a service message distinct from a fire alarm if the scattered light detected by the light receiver exceeds a threshold value related to impermissible pollution in or near the smoke inlet opening and unrelated to the specific fire parameters.

2. The fire detector as claimed in claim 1, wherein the second end of the optical waveguide comprises an optical lens or an optical prism.

3. The fire detector as claimed in claim 1, wherein the optical waveguide comprises part of a connecting web between a base body and a detector cap of the detector housing.

4. The fire detector as claimed in claim 1, wherein:

the detector housing has an axis of symmetry; and a plurality of light transmitters and light receivers are arranged distributed in a circumferential direction around the axis of symmetry in a respective scattered light arrangement in the region of the smoke inlet opening.

5. The fire detector as claimed in claim 1, wherein the light transmitter and the light receiver are arranged in a forward scatter arrangement with a scattered light angle in the range of 20° to 80°.

6. The fire detector as claimed in claim 1, wherein the light transmitter and the light receiver are arranged in a backwards scatter arrangement with a scattered light angle in the range of 110° to 150°.

7. The fire detector as claimed in claim 1, wherein the light transmitter and the light receiver form an integrated light transceiver and are arranged in a backwards scatter arrangement with a scattered light angle in the range of 150° to 180°.

8. The fire detector as claimed in claim 1, wherein the housing part in the region of the smoke inlet opening comprises one selected from the group consisting of: a base body or a detector cap of the detector housing; an insect guard; or a connecting web between a base body and a detector cap.

9. A fire detector comprising:

a detector housing with a smoke inlet opening;

a smoke detector, an optical smoke detector, a temperature detector, and/or gas detector mounted in the detector housing for detection of specific fire parameters corresponding to the presence of fire;

an analyzing unit for output of a fire alarm based on the detection of the specific fire parameters;

a light transmitter;

a light receiver connected to the analyzing unit for monitoring the smoke inlet opening for impermissible pollution and not for specific fire parameters;

wherein the light transmitter is mounted on a circuit carrier mounted in the detector housing; and an optical waveguide connected at a first end to the light transmitter and extending through the detector housing such that a second end of the optical waveguide is exposed to the smoke inlet opening, wherein the optical waveguide is configured to transfer light from the light transmitter, through the detector housing, and into the smoke inlet opening;

wherein the light transmitter and the light receiver comprise a scattered light arrangement with a scattered light volume defined by the scattered light arrangement in a region of the smoke inlet opening susceptible to pollution;

wherein the analyzing unit is configured to send a service message distinct from a fire alarm if the scattered light detected by the light receiver exceeds a threshold value related to impermissible pollution in or near the smoke inlet opening and unrelated to the specific fire parameters.

10. The fire detector as claimed in claim 9, wherein:

the detector housing has an axis of symmetry; and a plurality of light transmitters and light receivers are arranged distributed in a circumferential direction around the axis of symmetry in a respective scattered light arrangement in the region of the smoke inlet opening.

11. The fire detector as claimed in claim 9, wherein the light transmitter and the light receiver are arranged in a forward scatter arrangement with a scattered light angle in the range of 20° to 80°.

12. The fire detector as claimed in claim 9, wherein the light transmitter and the light receiver are arranged in a backwards scatter arrangement with a scattered light angle in the range of 110° to 150°.

13. The fire detector as claimed in claim 9, wherein the light transmitter and the light receiver form an integrated light transceiver and are arranged in a backwards scatter arrangement with a scattered light angle in the range of 150° to 180°.

14. The fire detector as claimed in claim 9, wherein the housing part in the region of the smoke inlet opening comprises one selected from the group consisting of: a base body or a detector cap of the detector housing; an insect guard; or a connecting web between a base body and a detector cap.

* * * * *